United States Patent
Yeo et al.

(10) Patent No.: US 9,973,024 B2
(45) Date of Patent: May 15, 2018

(54) METHOD FOR DETECTING CHANGE IN LOAD DURING WIRELESS CHARGING AND WIRELESS POWER TRANSMITTER THEREOF

(71) Applicants: Samsung Electronics Co., Ltd., Gyeonggi-do (KR); Kwangwoon University Industry-Academic Collaboration Foundation, Seoul (KR)

(72) Inventors: Sung-Ku Yeo, Daejeon (KR); Yun-Seong Eo, Gyeonggi-do (KR); Kyu-Sub Kwak, Seoul (KR); Sung-Bum Park, Gyeonggi-do (KR); Hyun-Jun Ahn, Gyeonggi-do (KR)

(73) Assignees: Samsung Electronics Co., Ltd (KR); Kwangwoon University Industry-Academic Collaboration Foundation (KR)

( * ) Notice: Subject to any disclaimer, the term of this patent is extended or adjusted under 35 U.S.C. 154(b) by 211 days.

(21) Appl. No.: 14/657,652

(22) Filed: Mar. 13, 2015

(65) Prior Publication Data
US 2016/0118845 A1 Apr. 28, 2016

(30) Foreign Application Priority Data
Oct. 28, 2014 (KR) .................. 10-2014-0147449

(51) Int. Cl.
*H02J 7/00* (2006.01)
*H02J 7/02* (2016.01)
(Continued)

(52) U.S. Cl.
CPC .............. *H02J 7/025* (2013.01); *H02J 5/005* (2013.01); *H02J 7/0013* (2013.01); *H02J 50/12* (2016.02); *H02J 50/40* (2016.02); *H02J 50/80* (2016.02)

(58) Field of Classification Search
CPC ............. H02J 7/025; H02J 7/045; H02J 5/005
(Continued)

(56) References Cited

U.S. PATENT DOCUMENTS 5,789,984 A * 8/1998 Davis ................... H03G 3/3042
330/279
8,030,887 B2 * 10/2011 Jung ......................... H02J 7/00
307/104

(Continued)

FOREIGN PATENT DOCUMENTS

JP 2002-257869 9/2002
JP 2007-324991 12/2007
(Continued)

*Primary Examiner* — Edward Tso
*Assistant Examiner* — Aaron Piggush
(74) *Attorney, Agent, or Firm* — The Farrell Law Firm, P.C.

(57) ABSTRACT

A wireless power transmitter and a method for detecting a change in load during wireless charging in the wireless power transmitter is provided. The wireless power transmitter includes a power transmission unit configured to transmit power to a wireless power receiver, a current detection unit configured to measure a voltage value corresponding to a current that is output to the power transmission unit while the power is transmitted from the power transmission unit, and a controller configured to adjust the power transmitted by the power transmission unit based on the measured voltage value.

15 Claims, 4 Drawing Sheets

(51) Int. Cl.
*H02J 5/00* (2016.01)
*H02J 50/12* (2016.01)
*H02J 50/80* (2016.01)
*H02J 50/40* (2016.01)

(58) Field of Classification Search
USPC .......................................... 320/108, 134, 162
See application file for complete search history.

(56) References Cited

U.S. PATENT DOCUMENTS

2007/0115741 A1    5/2007  Jung et al.
2007/0296483 A1   12/2007  Grandry
2009/0096413 A1*   4/2009  Partovi .................. H01F 5/003
                                                      320/108
2012/0235634 A1*   9/2012  Hall ........................ H03H 7/40
                                                      320/108
2013/0154383 A1    6/2013  Kasturi et al.

FOREIGN PATENT DOCUMENTS

KR    10-2007-0053398     5/2007
KR    10-2008-0042037     5/2008

* cited by examiner

METHOD FOR DETECTING CHANGE IN LOAD DURING WIRELESS CHARGING AND WIRELESS POWER TRANSMITTER THEREOF

PRIORITY

This application claims priority under 35 U.S.C. § 119(a) to a Korean Patent Application filed in the Korean Intellectual Property Office on Oct. 28, 2014, and assigned Serial No. 10-2014-0147449, the entire disclosure of which is incorporated herein by reference.

BACKGROUND

1. Field of the Invention

The present invention relates generally to a circuit and method for detecting current, and more particularly, to a current detection circuit and method for detecting a current that is output to a resonator for wireless power transmission in a wireless power transmitter.

2. Description of Related Art

In recent years, wireless (or non-contact) charging technology has been developed and applied to many electronic devices. The wireless charging technology is a charging technology based on wireless power transmission and reception. Wireless charging technology, enables a battery of a device, for example, a cellular phone, to be automatically charged when the user simply places the cellular phone on a charging pad without connecting the cellular phone to a separate charging connector. The wireless charging technology further increases the waterproof performance of electronic products by charging the electronic products wirelessly, and increases the portability of electronic devices since a wired charger is not required.

Charging based on the resonance wireless charging scheme is performed as follows. If a wireless power receiver (e.g., a mobile terminal) requiring to be charged, is positioned on a wireless power transmitter (e.g., a charging pad) transmitting wireless power, the wireless power transmitter wirelessly charges the wireless power receiver. In this wireless charging scheme, it is ideal that the amount of transmission power in the wireless power transmitter is matched with the amount of reception power in the wireless power receiver. However, the amount of reception power may inevitably be less than the amount of transmission power due to various internal and external factors which occur in the power transmission path. During wireless charging, the impedance is changed depending on the environment surrounding the antenna or the resonator, causing a decrease in the efficiency and output power. Therefore, there is a need for improving power transmission efficiency.

Accordingly, if the power, voltage and current delivered to the antenna or the resonator of the wireless receiver, which is an output load, can be accurately measured, the performance of the power transmission efficiency is improved.

SUMMARY

The present invention has been made to address at least the above-mentioned problems and/or disadvantages and to provide at least the advantages described below.

Accordingly, an aspect of the present invention is to provide a current detection circuit and a method for providing accurate measurement results for a current that is delivered to a resonator in a wireless power transmitter.

Another aspect of the present invention is to provide a current detection circuit and method for preventing the influence of a resistor for detecting a change in load.

In accordance with an aspect of the present invention, there is provided a wireless power transmitter including a power transmission unit configured to transmit power to a wireless power receiver, a current detection unit configured to measure a voltage value corresponding to a current that is output to the power transmission unit while the power is transmitted from the power transmission unit, and a controller configured to adjust the power transmitted by the power transmission unit based on the measured voltage value.

In accordance with another aspect of the present invention, there is provided a method for detecting a change in load during wireless charging in a wireless power transmitter. The method includes transmitting power to a wireless power receiver through a power transmission unit, measuring a voltage value corresponding to a current that is output to the power transmission unit while the power is transmitted from the power transmission unit, and adjusting the power that is transmitted from the power transmission unit, based on the measured voltage value.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially", it is meant that the recited characteristic, parameter, or value need not be achieved exactly, but that deviations or variations, including for example, tolerances, measurement error, measurement accuracy limitations and other factors known to those of skill in the art, occur in amounts that do not preclude the effect the characteristic was intended to provide.

A wireless charging method according to an embodiment of the present invention may be applied to any device that performs charging by receiving wireless power. The wireless charging method may be applied in various applications, such as wirelessly charging an electronic device, supplying wireless power to an electronic vehicle, supplying wireless power to a remote device, and supplying power to a ubiquitous wireless sensor. A wireless power receiver may be implemented as, for example, a mobile communication terminal, a Personal Digital Assistant (PDA), a Portable Multimedia Player (PMP), a smart phone, and the like.

Figure 1:
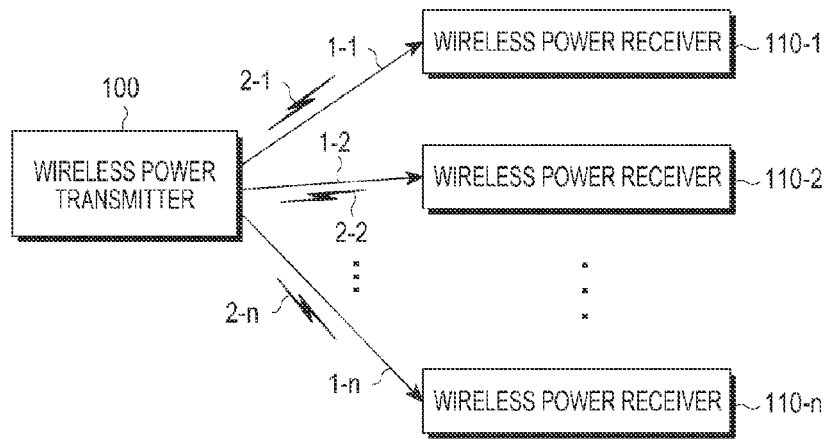
FIG. 1 is a block diagram illustrating a wireless charging system, according to an embodiment of the present invention.

FIG. 1 is a block diagram illustrating a wireless charging system, according to an embodiment of the present invention.

Referring to FIG. 1, the wireless charging system includes a wireless power transmitter 100 and at least one wireless power receivers 110-1, 110-2, . . . , 110-$n$.

The wireless power transmitter 100 wirelessly transmits powers 1-1, 1-2, . . . , 1-$n$ to the at least one wireless power receivers 110-1, 110-2, . . . , 110-$n$, respectively. The wireless power transmitter 100 may wirelessly transmit the power 1-1, 1-2, . . . , 1-$n$ only to the wireless power receiver that is authenticated through a preset authentication procedure.

The wireless power transmitter 100 forms a wireless connection with the at least one wireless power receiver 110-1, 110-2, . . . , 110-$n$. For example, the wireless power transmitter 100 transmits wireless power to the at least one wireless power receiver 110-1, 110-2, . . . , 110-$n$ through electromagnetic waves.

The at least one wireless power receiver 110-1, 110-2, . . . , 110-$n$ receives wireless power from the wireless power transmitter 100, and charges a battery mounted therein with the received power. In addition, the at least one wireless power receiver 110-1, 110-2, . . . , 110-$n$ sends, to the wireless power transmitter 100, messages 2-1, 2-2, . . . , 2-$n$ that include a request for transmission of wireless power, information necessary for reception of wireless power, status information of the wireless power receivers 110-1, 110-2, . . . , 110-$n$, or information (or control information) for controlling the wireless power transmitter 100. Likewise, the wireless power transmitter 100 sends, to the wireless power receivers 110-1, 110-2, . . . , 110-$n$, messages that include status information of the wireless power transmitter 100, information (or control information) for controlling the wireless power receivers 110-1, 110-2, . . . , 110-$n$, or the like.

Each of the at least one wireless power receiver 110-1, 110-2, . . . , 110-$n$ sends a message indicating its charging status to the wireless power transmitter 100.

The wireless power transmitter 100 includes a display unit (or an indication unit) such as a display, to display the status of each of the at least one wireless power receiver 110-1, 110-2, . . . , 110-$n$ based on the message received from each of the at least one wireless power receiver 110-1, 110-2, . . . , 110-$n$. In addition, the wireless power transmitter 100 also display the time it is expected that each of the wireless power receivers 110-1, 110-2, . . . , 110-$n$ will be completely charged.

The wireless power transmitter 100 transmit a control signal (or a control message) for disabling the wireless charging function to each of the at least one wireless power receiver 110-1, 110-2, . . . , 110-$n$. Upon receiving the control signal for disabling the wireless charging function from the wireless power transmitter 100, a wireless power receiver disables the wireless charging function.

Figure 2:
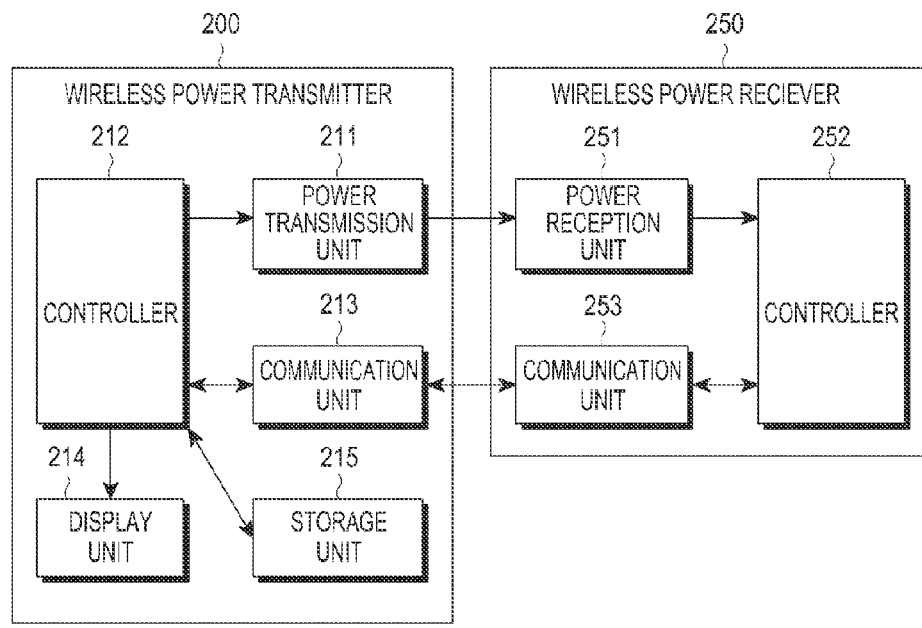
FIG. 2 is a block diagram illustrating a wireless power transmitter and a wireless power receiver, according to an embodiment of the present invention.

FIG. 2 is a block diagram illustrating a wireless power transmitter and a wireless power receiver, according to an embodiment of the present invention.

Referring to FIG. 2, a wireless power transmitter 200 and a wireless power receiver 250 is provided. The wireless power transmitter 200 includes a power transmission unit 211, a controller 212, a communication unit 213, a display unit 214, and a storage unit 215. The wireless power receiver 250 includes a power reception unit 251, a controller 252, and a communication unit 253.

The power transmission unit 211 provides the power required by the wireless power transmitter 200, and wirelessly provides the power to the wireless power receiver 250. Here, the power transmission unit 211 supplies the power in the form of an Alternating Current (AC) waveform, and may also convert the power of a Direct Current (DC) waveform into the power of the AC waveform using an inverter to supply the power of the AC waveform. The power transmission unit 211 may be implemented in the form of a built-in battery, or may be implemented in the form of a power receiving interface to receive power from the outside and supply the received power to other components. Those skilled in the art will readily understand that the power transmission unit 211 includes any means that can provide the power of the AC waveform.

The controller 212 controls the overall operation of the wireless power transmitter 200. The controller 212 controls the overall operation of the wireless power transmitter 200 using an algorithm, a program or an application required for control, which is read from the storage unit 215. The controller 212 may be implemented in the form of, for example, a Central Processing Unit (CPU), a microprocessor, a mini-computer.

The communication unit 213 performs communication with the wireless power receiver 250 in a predetermined manner. The communication unit 213 receives power information from the wireless power receiver 250. Here, the power information includes at least one of the capacity of the wireless power receiver 250, the battery level, the number of times charging occurs, the usage, the battery capacity, and the battery percentage. In addition, the communication unit 213 transmits a charging function control signal for controlling the charging function of the wireless power receiver 250. The charging function control signal is a control signal for controlling the power reception unit 251 of the wireless power receiver 250 to enable or disable the charging function.

The communication unit 213 receives a signal not only from the wireless power receiver 250, but also from another wireless power transmitter.

The controller 212 displays the status of the wireless power receiver 250 on the display unit 214 based on the message that is received from the wireless power receiver 250 through the communication unit 213. In addition, the controller 212 may display, on the display unit 214, the time it is expected that the wireless power receiver 250 will be completely charged.

Figure 3:
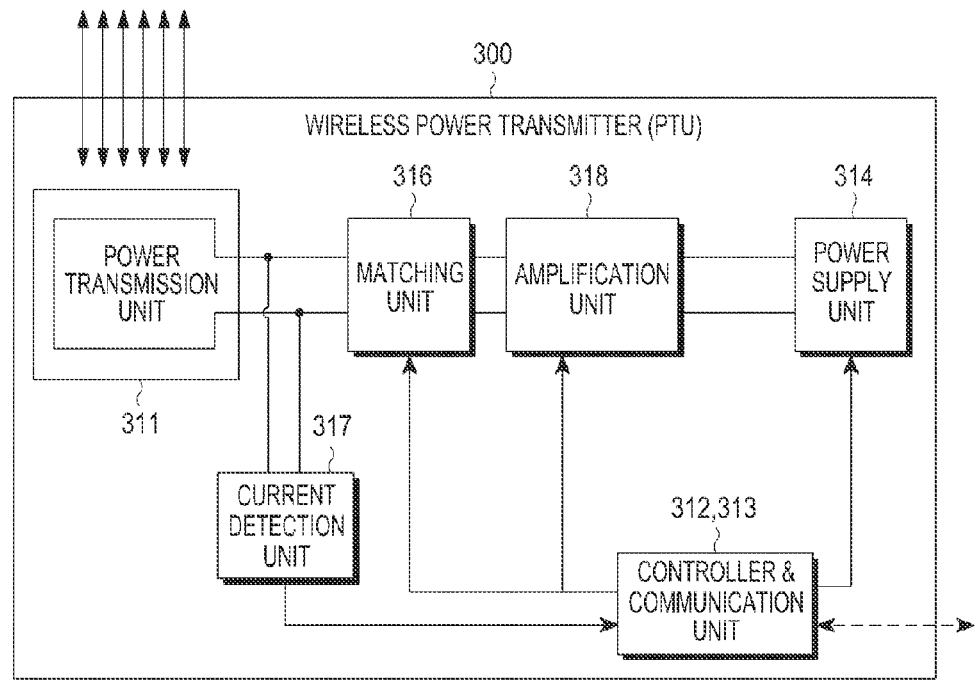
FIG. 3 is a detailed block diagram of a wireless power transmitter, according to an embodiment of the present invention.

FIG. 3 is a detailed block diagram of a wireless power transmitter, according to an embodiment of the present invention.

Referring to FIG. 3, a wireless power transmitter 300 is provided. The wireless power transmitter 300 includes a power transmission unit 311, a controller 312/communication unit 313 (or Micro Controller Unit (MCU)/Out-of-band Signaling Unit), a power supply unit 314, an amplification unit (or a power amplifier) 318, and a matching unit (or matching circuit) 316. The wireless power transmitter may optionally include a current detection unit 317.

The power supply unit 314, which is configured with, for example, a Voltage Control Oscillator (VCO), supplies power to the VCO so as to generate a resonant frequency signal determined by the controller 312/communication unit 313. Accordingly, the power supply unit 314 outputs DC power having a preset voltage value. The voltage value of the DC power that is output from the power supply unit 314 is controlled by the controller 312/communication unit 313.

The amplification unit 318 serves to amplify the signal generated in the power supply unit 314 with high power. Accordingly, the DC power that is output from the power supply unit 314 is output to the amplification unit 318. The amplification unit 318 amplifies the DC power at a predetermined gain. In addition, the amplification unit 318 converts the DC power into AC power based on the signal that is input from the controller 312/communication unit 313. Accordingly, the amplification unit 318 outputs the AC power.

The matching unit 316 performs impedance matching. For example, by adjusting the impedance seen from the matching unit 316, the matching unit 316 controls the output power to have high efficiency or high power. The matching unit 316 adjusts the impedance under control of the controller 312/communication unit 313. The matching unit 316 includes at least one of a coil and a capacitor. The controller 312/communication unit 313 controls the status of its connection with at least one of the coil and the capacitor, and performs impedance matching according thereto.

The power transmission unit 311 transmits the input AC power to a power reception unit of a wireless power receiver. The power transmission unit 311 of the wireless power transmitter 300 and the power reception unit 251 of the wireless power receiver are implemented with resonance circuits having the same resonant frequency.

The controller 312/communication unit 313 collectively controls a wireless power transmission operation. To this end, the controller 312/communication unit 313 monitors the current and voltage of the signal that is delivered to the power transmission unit 311, and controls the power supply unit 314, the amplification unit 318, and the matching unit 316 to keep the set value within a predetermined range.

In addition, the controller 312/communication unit 313 performs communication with a controller/communication unit of a wireless power receiver in relation to the wireless power transmission operation. To this end, the controller 312/communication unit 313 is configured by applying one of various short-range wireless communication schemes, such as Bluetooth. The controller 312/communication unit 313 may be configured with, for example, an MCU.

The current detection unit 317 monitors the current and voltage of the signal that is delivered to the power transmission unit 311. The current detection unit 317 is disposed between an output end of the matching unit 316 and an input end of the power transmission unit 311, and delivers a measurement value obtained by measuring the current and voltage of the signal that is delivered to the power transmission unit 311, to the controller 312/communication unit 313. Accordingly, the controller 312/communication unit 313 performs power transmission control through the power transmission unit 311 based on the measurement value.

The current detection unit 317 may be implemented in a variety of ways.

For example, a current detection circuit may be divided into a circuit for detecting a DC current and a circuit for detecting a current that changes over time, such as an AC/Radio Frequency (RF) current. The current detection unit 317, may detect an AC/RF current, and may be implemented to effectively detect an AC/RF current especially in a circuit having a differential structure.

The current detection circuit can detect a current by generally using a current detection resistor, but the efficiency of the wireless power transmission may be reduced by the current detection resistor. In order to prevent the reduction in efficiency, a current detection resistor with a very low resistance may be used. In this case, a difference between voltages at both ends of the current detection resistor, which corresponds to the current to be detected, is very small, whereas a voltage across the load is very large. The voltage across the load may interfere with the current detection. For example, a situation may occur, in which it is not possible to distinguish only the desired voltage difference from the simple voltage signal generated by, for example, a Common Mode Rejection Ratio (CMRR) of an operational amplifier (OP-Amp) circuit. This may be inefficient for the wireless power transmission system.

In order to overcome these shortcomings, in various embodiments of the present invention, the current detection unit 317 is provided, which can extract a voltage component being proportional to an AC/RF current signal while removing a voltage interference component due to the asymmetry even though an output voltage and a current signal at both ends of the operational amplifier are asymmetric.

In the current detection unit 317, a plurality of current detection resistors may be disposed in a differential current signal path. Accordingly, the current detection unit 317 may be implemented to differentially measure an AC/RF current signal and extract only the voltage component being proportional to the AC/RF current signal by a predetermined algorithm in a combination of detected voltages that are proportional to the current.

The detailed circuit configuration of the current detection unit 317 is described with reference to FIGS. 4 to 6.

Figure 4:
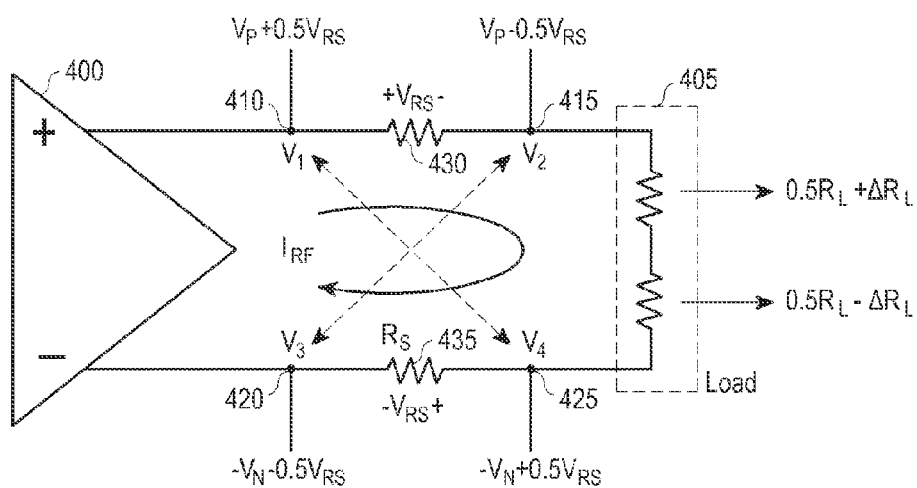
FIG. 4 is a circuit diagram illustrating a configuration of a differential current detection circuit, according to an embodiment of the present invention.

FIG. 4 is a circuit diagram illustrating a configuration of a differential current detection circuit, according to an embodiment of the present invention.

Referring to FIG. 4, the current detection circuit includes a power amplifier 400, a first current detection resistor 430, a second current detection resistor 435, and a load 405 for load detection. The current detection circuit in FIG. 4 provides a scheme of disposing current detection resistors in series in a signal path for measuring an AC/RF current that is output from the power amplifier 400 or delivered to a resonator, and of measuring a difference between voltages across the current detection resistors. In particular, the proposed scheme is to equally dispose two current detection resistors in positive and negative paths in the differential structure, to sample voltages at both ends (i.e., 4 places) of the current detection resistors in a cross manner. The cross scheme is configured so that the common mode is reduced and the effect of the asymmetry is offset.

The power amplifier 400 applies a first output voltage to one end of the load 405, and applies a second output voltage opposite to the first output voltage to another end of the load 405. The second output voltage is opposite to the first output voltage in terms of the polarity of the voltage. The power amplifier 400 may be a class-D amplifier. The load 405 is a load corresponding to an antenna or a resonator.

The load 405 may be denoted as '$R_L$', and may be implemented as two resistors, including a first resistor and a second resistor, as shown in FIG. 4, to express the asymmetry in terms of the differential circuit. The first resistor and the second resistor may be different from each other by $\Delta R_L$ in terms of the resistance. In this case, the first resistor is expressed as '$0.5R_L + \Delta R_L$', and the second resistor is expressed as '$0.5R_L - \Delta R_L$'. The middle point between the first resistor and the second resistor is grounded.

The first current detection resistor 430 and the second current detection resistor 435 may each be denoted as '$R_S$'. The current detection circuit finds a voltage '$V_{RS}$' across the first current detection resistor 430. The found voltage '$V_{RS}$' is used to detect the amount of current after it is amplified in a circuit that is connected to the current detection circuit. However, in the case of a current detection circuit in which one current detection resistor is disposed, the problem of the common mode occurs, since the difference between voltages at both ends of the resistor is very large. Therefore, in the current detection circuit, two current detection resistors are disposed so that if the voltage swing of the signal to be detected is very large, the current detection circuit is not be affected by the problems of, for example, the common mode of an internal circuit and the asymmetry.

The two current detection resistors, first current detection resistor 430 and second current detection resistor 435 are used to control an operational amplifier by measuring a current signal $I_{RF}$ that is changed as a load impedance changes when a voltage and a current signal that are output from the power amplifier 400 are applied to the load (e.g., the load 405) such as the antenna or the resonator.

First, the first current detection resistor 430 is disposed between a first output of the power amplifier 400 and the load 405, and the second current detection resistor 435 is disposed between a second output of the power amplifier 400 and the load 405.

A first voltage $V_1$ 410 is a voltage at a front end of the first current detection resistor 430, and a second voltage $V_2$ 415 is a voltage at a rear end of the first current detection resistor 430. A third voltage $V_3$ 420 is a voltage at a front end of the second current detection resistor 435, and a fourth voltage $V_4$ 425 is a voltage at a rear end of the second current detection resistor 435.

Figure 5:
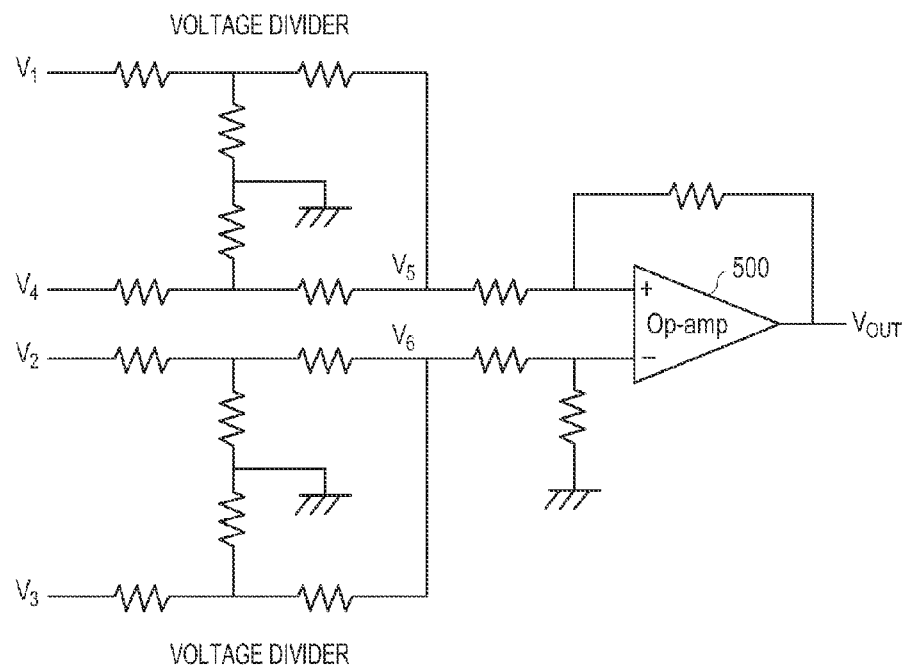
FIG. 5 is a circuit diagram illustrating a configuration of an amplification unit circuit connected to a current detection circuit, according to an embodiment of the present invention.

The current detection circuit finds the voltages that are input to an operational amplifier 500, shown in FIG. 5, based on Equation (1) and Equation (2).

$$V_5 = V_1 + V_4 = (V_P + 0.5V_{RS}) + (-V_N + 0.5V_{RS}) = (V_P - V_N) + V_{RS} \quad \text{Equation (1)}$$

$$V_6 = V_2 + V_3 = (V_P - 0.5V_{RS}) + (-V_N - 0.5V_{RS}) = (V_P - V_N) - V_{RS} \quad \text{Equation (2)}$$

In Equations (1) and (2), $V_P$ and $V_N$ represent voltages at a positive end (+) and a negative end (−) for a signal voltage across the load 405, respectively. In various embodiments of the present invention, $V_P$ will be referred to as a first reference voltage and $V_N$ will be referred to as a second reference voltage. Further, in Equations (1) and (2), $V_{RS}$ represents a voltage across each of the first current detection resistor 430 and the second current detection resistor 435. The voltage $V_{RS}$ is a product of the current $I_{RF}$ to be detected, and a value of the resistor $R_S$, and may be a very low voltage. In other words, $V_{RS}$ is expressed as in Equation (3).

$$V_{RS} = I_{RF} * R_S \quad \text{Equation (3)}$$

On the other hand, in accordance with Equation (1), a fifth voltage $V_5$ may be obtained by summing the first voltage $V_1$ 410 and the fourth voltage $V_4$ 425. Further, in accordance with Equation (2), a sixth voltage $V_6$ may be obtained by summing the second voltage $V_2$ 415 and the third voltage $V_3$ 420.

This can be implemented as a circuit, as shown in FIG. 5.

FIG. 5 is a circuit diagram illustrating a configuration of an amplification unit circuit connected to a current detection circuit, according to an embodiment of the present invention.

Referring to FIG. 5, the voltages $V_1$, $V_2$, $V_3$ and $V_4$ at both ends of the first current detection resistor 430 and the second current detection resistor 435, shown in FIG. 4, may be summed by voltage dividers in a cross manner, and then may be output in the form of the fifth voltage $V_5$ and the sixth voltage $V_6$. Here, a first voltage divider serves to sum the first voltage $V_1$ at a front end of the first current detection resistor 430 and the fourth voltage $V_4$ at a rear end of the second current detection resistor 435. In addition, a second voltage divider serves to sum the second voltage $V_2$ at a rear end of the first current detection resistor 430 and the third voltage $V_3$ at a front end of the second current detection resistor 435. The first voltage divider and the second voltage divider are connected to a front end of an operational amplifier 500.

Accordingly, the fifth voltage $V_5$ and the sixth voltage $V_6$ are input to the operational amplifier 500, and a difference between the fifth voltage $V_5$ and the sixth voltage $V_6$ is obtained through the operational amplifier 500. An output voltage $V_O$ obtained through a subtraction circuit that uses the operational amplifier 500 is expressed as shown in Equation (4). In this case, the operational amplifier 500 serves to perform amplification on the difference between the fifth voltage $V_5$ and the sixth voltage $V_6$ at a gain A.

$$V_O = A*(V_5 - V_6) = A(((V_P - V_N) + V_{RS}) - ((V_P - V_N) - V_{RS})) = 2A*V_{RS} \quad \text{Equation (4)}$$

where A represents a predetermined gain in the operational amplifier 500. In accordance with Equation (4), the output voltage $V_O$ that is output from the operational amplifier 500 is output as a voltage that is not affected by '$R_L$' or the load 405, without being affected by $V_P$ and $V_N$.

As described above, it is possible to obtain an output voltage $V_O(=2A*V_{RS})$ that is not affected by a change in '$R_L$' or the load 405.

In addition, the foregoing equations may be applied even if the values of $V_P$ and $V_N$ are different compared with the asymmetry of the differential structure, making it possible to improve the detection performance due to the asymmetry. Further, as for the common mode problems, $V_5$ or $V_6$ may be expressed as $V_P - V_N$, when seen from an input of the operational amplifier 500. Thus, if the asymmetry is not severe (e.g., if the difference between values of $V_P$ and $V_N$ falls within a predetermined range), a value that is significantly reduced from the absolute value of $V_P$ and $V_N$, which is the voltage swing of the load 405, is applied in the common mode, thus solving the problem that the desired signal is not seen by the output value of the common mode signal.

The output voltage $V_O$ that is output from the operational amplifier 500 needs to be converted from a signal in the form of AC back into a constant voltage in the form of DC in order to be input to the controller 312/communication unit 313.

Figure 6:
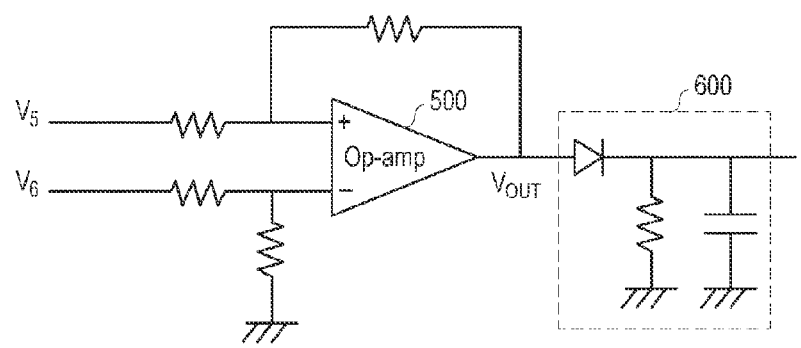
FIG. 6 is a circuit diagram illustrating a configuration of a rectifier circuit connected to the amplification unit circuit, according to an embodiment of the present invention.

FIG. 6 is a circuit diagram illustrating a configuration of a rectifier circuit connected to the amplification unit circuit, according to an embodiment of the present invention.

Referring to FIG. 6, a rectifier circuit 600 for DC leveling is provided.

Referring back to FIG. 3, the controller 312/communication unit 313 of the wireless power transmitter 300 determines a power transmission control value based on the output voltage $V_O$ that is provided from the current detection unit 317. Accordingly, the power supply unit 314 generates the power based on the power transmission control value provided from the controller 312/communication unit 313, and the power transmission unit 311 (e.g., the resonator) transmits the power at the resonant frequency that is adjusted depending on the generated power.

As described above, the current detection unit 317, shown in FIG. 3, may be configured to include the components in FIGS. 4 and 5, and may also be configured to further include the rectifier circuit 600, shown in FIG. 6, so that the output voltage $V_O$ may be provided to the controller 312/communication unit 313.

If the current detection unit 317 is implemented to include the configurations in FIGS. 4 and 5, the current detection unit 317 includes a first amplifier for supplying a first output voltage to one end of the load, and supplying a second output voltage opposite to the first output voltage to another end of the load, a first current detection resistor disposed between a first output of the first amplifier and the load, a second current detection resistor disposed between a second output of the first amplifier and the load, and a second amplifier for finding a fifth voltage obtained by summing a first voltage at a front end of the first current detection resistor and a fourth voltage at a rear end of the second current detection resistor, and a sixth voltage obtained by summing a second voltage at a rear end of the first current detection resistor and a third voltage at a front end of the second current detection resistor, and then outputting an output voltage that is proportional to a difference between the fifth voltage and the sixth voltage.

Figure 7:
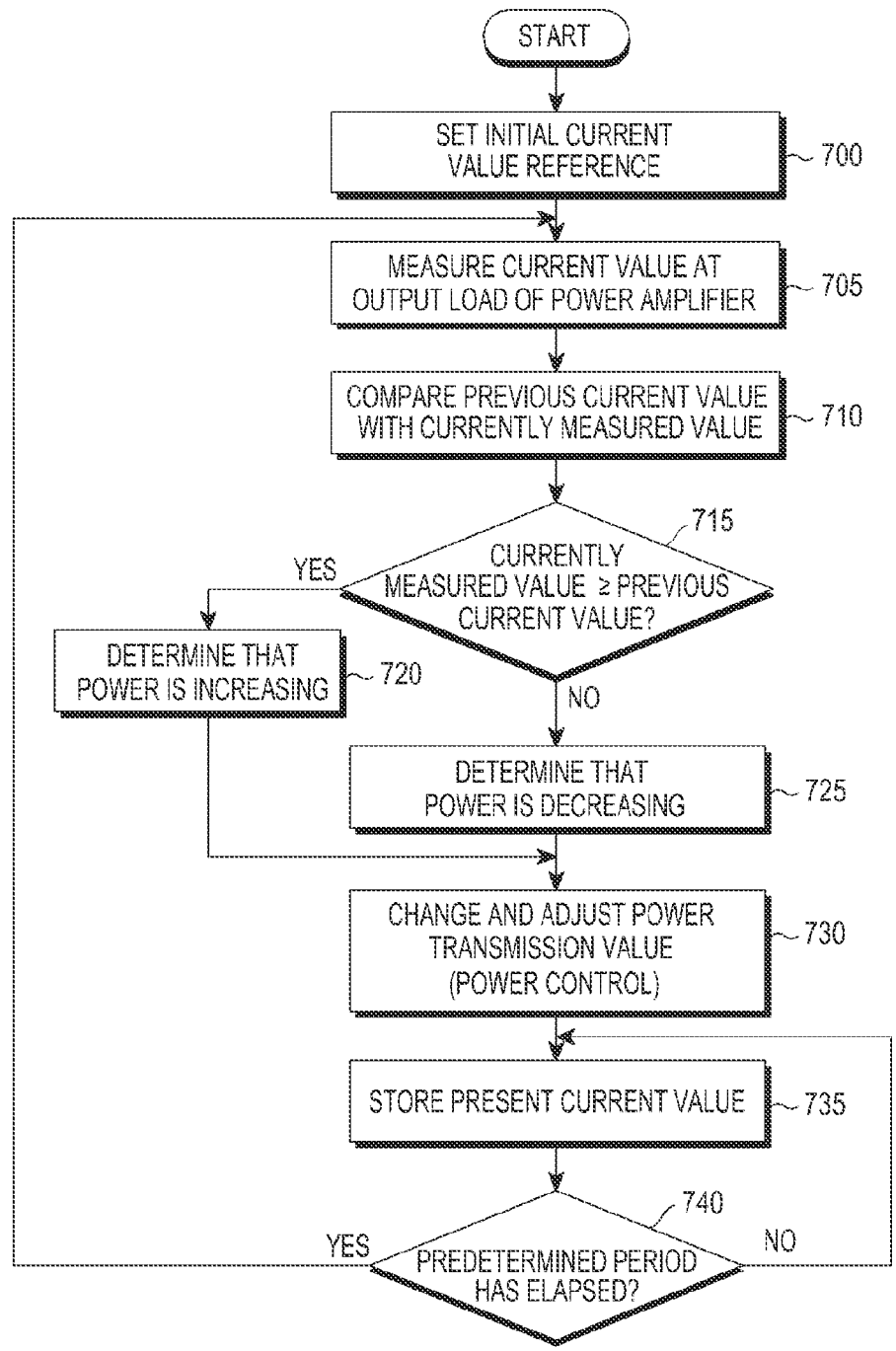
FIG. 7 is a flowchart illustrating an operation of a wireless power transmitter for power adjustment, according to an embodiment of the present invention.

FIG. 7 is a flowchart illustrating an operation of a wireless power transmitter for power adjustment, according to an embodiment of the present invention.

Referring to FIG. 7, in step 700, the controller 312/communication unit 313 of the wireless power transmitter 300 sets an initial current value reference 'I_init' to generate a predetermined resonant frequency signal. The controller 312/communication unit 313 controls the power supply unit 314 to output a voltage corresponding to the initial current value. The controller 312/communication unit 313 controls the components of the wireless power transmitter 300 to keep the set value within a predetermined range by monitoring the current and voltage of the signal that is delivered to the power transmission unit 311 while controlling the output of the voltage.

In step 705, the controller 312/communication unit 313 measures a current value at the load 405 of the power amplifier 400 in order to monitor the current and voltage of the signal that is delivered to the power transmission unit 311. Specifically, after differentially measuring a current signal that is output to the power transmission unit 311, the controller 312/communication unit 313 measures the current value by calculating a voltage being proportional to the current signal by a predetermined algorithm (e.g., as shown in the above equations) in a combination of detected voltages that are proportional to the current. Accordingly, it can be noted that the voltage value that is output to the power transmission unit 311 is the output value $V_O$.

Therefore, it can be understood that measuring the current value corresponds to calculating the output voltage $V_O$. In other words, determining the power transmission control value based on the output voltage $V_O$, is equivalent to the controller 312/communication unit 313 determining the power transmission control value based on the current value. Therefore, in step 710, the controller 312/communication unit 313 compares the measured current value with the current measurement value. If it is determined in step 715 that the measured current value is greater than or equal to a previous current value, the controller 312/communication unit 313 determines in step 720 that the power is increasing, and changes and adjusts a power transmission value in response to the increase in power in step 730. In other words, the controller 312/communication unit 313 adjusts the transmission power to be reduced.

On the other hand, if it is determined in step 715 that the measured current value is not greater than or equal to a previous current value (i.e., if the measured current value is less than the previous current value), the controller 312/communication unit 313 determines in step 725 that the power is decreasing, and changes and adjusts a power transmission value in response to the decrease in power in step 730. In other words, controller 312/communication unit 313 adjusts the transmission power to be increased. Thereafter, the controller 312/communication unit 313 stores the currently measured current value in step 735, and then it if is determined in step 740 that a predetermined period has elapsed, the controller 312/communication unit 313 returns to step 705 to repeatedly perform the above-described process at a predetermined period.

As is apparent from the foregoing description, according to various embodiments of the present invention, even though the impedance may be changed depending on the environment surrounding the resonator, it is possible to exclude the influence of the resistor for detecting a change in load, thus making it possible to provide accurate current detection results.

In addition, according to various embodiments of the present invention, it is possible to provide a current detection circuit capable of extracting only the voltage component being proportional to an AC/RF current signal desired in various differential circuits including a power amplifier and various circuits that use an AC/RF signal.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A wireless power transmitter comprising:
   a power transmission unit configured to transmit power to a wireless power receiver;
   a current detection unit configured to measure a voltage value corresponding to a current that is output to the power transmission unit while the power is transmitted from the power transmission unit by using a plurality of current detection resistors disposed in series in a differential current path; and a controller configured to adjust the power transmitted by the power transmission unit based on the measured voltage value, wherein the current detection unit comprises at least one amplifier of which two outputs are connected to each of the plurality of current detection resistors.

2. The wireless power transmitter of claim 1, wherein the current detection unit comprises:
   a first amplifier configured to supply a first output voltage to a first end of a load, and supply a second output voltage opposite to the first output voltage to a second end of the load;
   a first current detection resistor disposed between a first output of the first amplifier and the load;
   a second current detection resistor disposed between a second output of the first amplifier and the load; and
   a second amplifier configured to find a fifth voltage obtained by summing a first voltage at a front end of the first current detection resistor and a fourth voltage at a rear end of the second current detection resistor, find a sixth voltage obtained by summing a second voltage at a rear end of the first current detection resistor and a third voltage at a front end of the second current detection resistor, and output an output voltage that is proportional to a difference between the fifth voltage and the sixth voltage.

3. The wireless power transmitter of claim 2, wherein the voltage value that is output to the power transmission unit is the output voltage.

4. The wireless power transmitter of claim 2, wherein the first amplifier is a class-D power amplifier.

5. The wireless power transmitter of claim 2, wherein the second amplifier is an operational amplifier for performing amplification on the difference between the fifth voltage and the sixth voltage at a predetermined gain.

6. The wireless power transmitter of claim 2, wherein an input end of the second amplifier is connected to a first voltage divider for summing the first voltage at the front end of the first current detection resistor and the fourth voltage at the rear end of the second current detection resistor, and to a second voltage divider for summing the second voltage at the rear end of the first current detection resistor and the third voltage at the front end of the second current detection resistor.

7. The wireless power transmitter of claim 2, further comprising a rectifier circuit that is connected to an output end of the second amplifier, and which rectifies the output voltage in a form of Alternating Current (AC) into an output voltage in a form of Direct Current (DC).

8. The wireless power transmitter of claim 1, wherein the controller is further configured to compare the measured voltage value with a previously measured value, and decrease the power transmitted by the power transmission unit, when the measured voltage value is greater than or equal to the previously measured value.

9. The wireless power transmitter of claim 1, wherein the controller is further configured to compare the measured voltage value with a previously measured value, and increase the power transmitted by the power transmission unit, when the measured voltage value is less than the previously measured value.

10. The wireless power transmitter of claim 1, further comprising:
    a power supply unit configured to generate a voltage of DC power under control of the controller;
    an amplification unit configured to convert the DC power generated in the power supply unit into AC power; and
    a matching unit configured to perform impedance matching.

11. The wireless power transmitter of claim 10, wherein the current detection unit is disposed between an output end of the matching unit and an input end of the power transmission unit.

12. A method for detecting a change in load during wireless charging in a wireless power transmitter, the method comprising:
    transmitting power to a wireless power receiver through a power transmission unit;
    measuring, by a current detection unit, a voltage value corresponding to a current that is output to the power transmission unit while the power is transmitted from the power transmission unit by using a plurality of current detection resistors disposed in series in a differential current path; and
    adjusting the power that is transmitted from the power transmission unit, based on the measured voltage value,
    wherein the current detection unit comprises at least one amplifier of which two outputs are connected to each of the plurality of current detection resistors.

13. The method of claim 12, wherein adjusting the power comprises:
    comparing the measured voltage value with a previously measured value, and decreasing the power transmitted by the power transmission unit, when the measured voltage value is greater than or equal to the previously measured value.

14. The method of claim 12, wherein adjusting the power comprises:
    comparing the measured voltage value with a previously measured value, and increasing the power transmitted by the power transmission unit, when the measured voltage value is less than the previously measured value.

15. The method of claim 12, wherein measuring the voltage value comprises:
    differentially measuring a current signal that is output to the power transmission unit; and
    calculating a voltage that is proportional to the current signal, by a predetermined algorithm in a combination of detected voltages that are proportional to the current.

* * * * *